United States Patent [19] [11] 3,832,640
Cederquist et al. [45] Aug. 27, 1974

[54] TIME DIVISION INTERPOLATOR

[75] Inventors: Alf L. Cederquist, Ypsilanti; Shaun S. Devlin, Birmingham, both of Mich.

[73] Assignee: Ford Motor Company, Dearborn, Mich.

[22] Filed: Dec. 11, 1972

[21] Appl. No.: 314,047

[52] U.S. Cl............ 328/38, 328/34, 328/46
[51] Int. Cl. ............................ H03k 5/00
[58] Field of Search ........ 328/46, 38, 34; 307/220

[56] References Cited
UNITED STATES PATENTS

| | | | |
|---|---|---|---|
| 3,375,448 | 3/1968 | Newman et al. | 328/46 |
| 3,375,449 | 3/1968 | Ribour et al. | 328/46 |
| 3,484,699 | 12/1969 | Israel | 328/46 |
| 3,581,116 | 5/1971 | Leostic | 328/46 |
| 3,657,658 | 4/1972 | Kubo | 328/38 |
| 3,673,391 | 6/1972 | Lougheed | 328/38 |

Primary Examiner—Rudolph V. Rolinec
Assistant Examiner—B. P. Davis
Attorney, Agent, or Firm—Keith L. Zerschling; Robert A. Benzinger

[57] ABSTRACT

An electronic circuit is disclosed for generating an output signal having a frequency which is a selected multiple of a variable input signal frequency. To obtain the desired multiplication, a relatively high clock signal frequency is divided by a number which corresponds to the selected multiple to produce a second signal having a lower frequency than the clock signal frequency. The individual pulses of the lower frequency signal are counted during the time interval between two consecutive input signal pulses to generate a second, variable, number which is then used to divide the clock signal frequency in the time period immediately following the occurrence of the second of the two consecutive input signal pulses. The resulting output signal therefore occurs at a frequency which is equal to the frequency of the input signal multiplied by the desired multiplicative factor.

20 Claims, 3 Drawing Figures

TIME DIVISION INTERPOLATOR

BACKGROUND OF THE INVENTION

1. Field of the Invention

The present invention is related to the field of electrical circuits for generating output signals at a selected frequency, or repetition rate, relative to an input signal. More particularly, the present invention is related to the field of electrical circuits for converting an input signal having a first frequency to an output signal having a second frequency. More particularly still, the present invention is related to the field of electrical circuits for converting a first signal occurring at a relatively low frequency to a second signal occurring at a relatively high frequency which is a predetermined and selected multiple of the low frequency.

2. Description of the Prior Art

In the application of electrical control systems to machinery having rotating parts in which various aspects of the control function must be performed in response to predetermined angular relationships of the rotating parts relative to a fixed frame of reference, it is desirable to provide a device or means which will produce an output signal indicative of the angular relationship between the rotating parts and the fixed frame of reference.

If a small number of angular relationships are of interest, it is the normal practice to provide an individual sensor capable of identifying each angular relationship. One example of such a device may be found in copending commonly assigned patent application Ser. No. 124,080, now abandoned in favor of continuation in part application Ser. No. 312,996 filed in the name of Robert W. Mooney, et al., and titled "Process for Establishing Ignition Timing of an Internal Combustion Engine" wherein a magnetic sensor responds electrically to a change in flux pattern caused by selected discontinuities in a ferromagnetic member rotated by the engine in proximity to the sensor. Such an approach in neither practical nor economical when the number of angular relationships are above about five, for example, or where the angular differences are slight. On the other hand, when a large number of angular relationships are of interest, a shaft encoder is normally provided to identify all angular relationships so that the ones of interest may be identified by associated electrical or electronic circuitry provided the shaft is not required to undergo long periods of rotation. Shaft encoders are expensive since they identify all angular relationships with a high degree of accuracy. Their comparatively great expense is not justifiable if all angular relationships are not of interest or if the accuracy of identification of the angular relationships of interest does not approach the accuracy provided by a shaft encoder. The use of shaft encoders also requires that the associated machinery be designed to accept these devices at a location with an exposed rotating member and that the operational environment for such a device be as clean and as consistent in temperature and humidity as possible. A controlled environment is therefore preferred. These partiicular requirements of shaft encoders render them totally unsuited for use in determining, for example, the crankshaft angle of an internal combustion engine.

Since electrical or electronic circuitry can be made relatively insensitive to its environment and can be manufactured in volume, for example in integrated circuit form, at comparatively low cost, it is an object of the present invention to provide electrical or electronic circuitry which may respond to signals indicative of a small number of angular relationships between a rotating part and a fixed frame of reference and which may thereafter generate or synthesize an output signal which is indicative of a larger number of angular relationships between the rotating part and the fixed frame of reference. It is also an object of the present invention to provide a circuit for generating a predetermined number of output pulses for every pair of received input pulses. In particular, it is an object of the present invention to provide such a circuit in which the output pulses are of uniform configuration and have a frequency which is a selected multiple of the frequency of the input pulses.

It is known in the electronics art that a clock signal occurring at a relatively high frequency may be divided by a suitably selected number or value to produce an output signal having a frequency lower than the clock signal and having a predetermined or selected numerical relationship with respect to the clock signal frequency. Such a circuit could be utilized to accomplish the broad objectives of the present invention if the input signal frequency were known to predetermined since the value of the clock signal divisor could be suitably selected by simple mathematical calculation to yield a divisor such that an output signal having the desired multiplicative relationship with respect to the input signal would be generated. However, this could not be accomplished in the case of an input signal having a variable frequency unless one were able to periodically change the value of the clock signal divisor to continuously result in the desired output signal frequency relationship. It therefore becomes a specific object of the present invention to provide electronic circuitry for periodically generating a signal in the form of a number which may be used to divide a relatively high frequency clock signal into an output signal having a frequency with a predetermined multiplicative relationship with respect to a variable frequency input signal. It is also a specific object of the present invention to provide a circuit for generating a number which may be used to divide a clock signal frequency to generate an output signal having a frequency with a predetermined multiplicative relationship to an input signal and wherein that relationship may be of the order of at least two magnitudes greater than the input signal. It is also a specific object of the present invention to provide a circuit for generating a number which may be used to divide a clock signal frequency to produce an output signal having a frequency with a predetermined multiplicative relationship to an input signal frequency and wherein the number is regenerated every occurrence of the input signal pulse.

SUMMARY OF THE PRESENT INVENTION

The present invention contemplates the generation of an output signal having a predetermined multiplicative relationship with respect to a variable frequency input signal by generating a high frequency clock signal and dividing that signal frequency by a calculated value selected to produce an output signal having the desired multiplicative relationship with respect to the input signal. The number or value used to divide the clock signal frequency is periodically regenerated or recalculated to account for the variations in input signal frequency. The number or value is generated by dividing the clock signal frequency by a value which corresponds to the selected multiplicative relationship to produce an intermediate signal having a plurality of pulses occurring at a frequency which equals the clock signal frequency divided by the selected multiplicative number or value, by then counting the number of intermediate signal pulses occurring between two consecutive input signal pulses to generate a count number and by then using this generated count number as a divisor for the clock signal frequency to generate an output signal having a frequency which equals the clock signal frequency divided by the count number. The resulting output signal frequency is therefore equal to the input signal frequency multiplied by the selected multiplicative value within an accuracy which is determined by the constancy of the input signal frequency over three consecutive input signal pulses.

DETAILED DESCRIPTION OF THE PREFERRED EMBODIMENT

Figure 1:
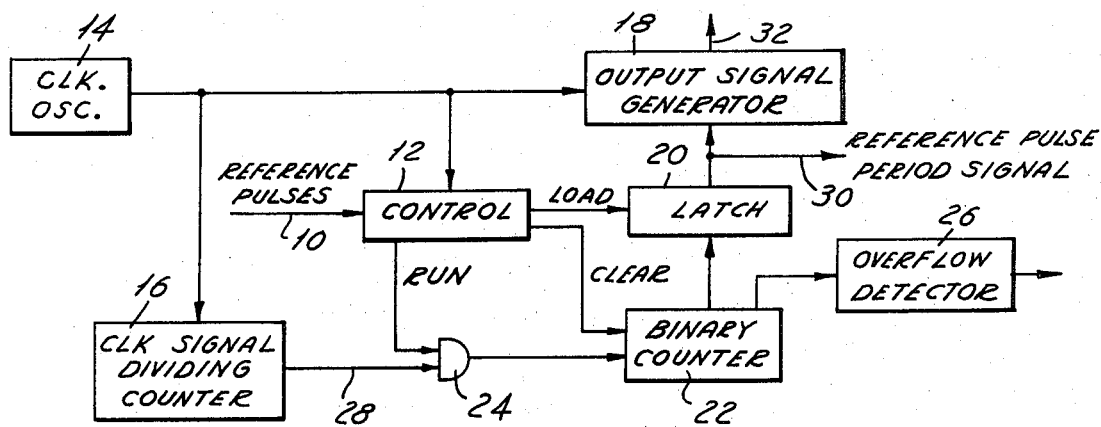
FIG. 1 illustrates a block diagram of an electronic circuit according to the present invention.

Referring now to FIG. 1, a block diagram of an electronic circuit according to the present invention is illustrated. The reference pulses whose frequency is to be multiplied are generated by an external source and are received at input 10 by a control device 12. The control device 12 also receives an input signal from the clock oscillator 14 which also applies the clock signal to clock signal dividing counter 16 and output signal generator 18. By way of example, the frequency of the input pulses may be from about 10 to about 400 Hz. while the frequency of the clock oscillator may be from about 5 to about 20 MHz.

Figure 2:
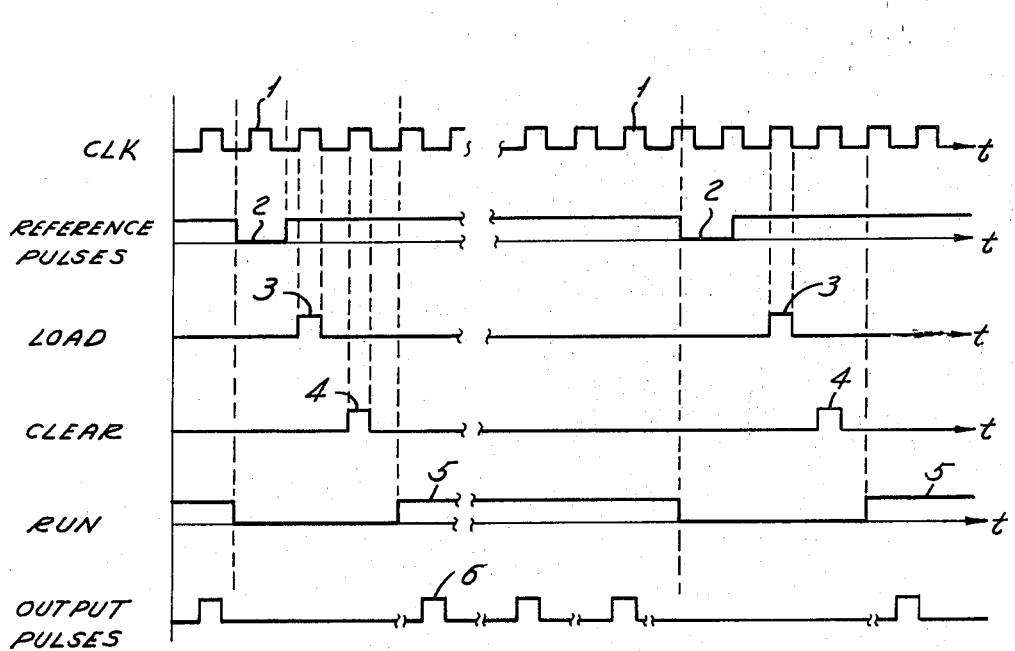
FIG. 2 illustrates a series of signal waveform diagrams which illustrate the operation of the circuit of FIG. 1.

With reference to FIGS. 1 and 2 and in particular to FIG. 2, the operation of the control device 12 of FIG. 1 will be described. Control device 12 is operative to generate three separate output signal identified as LOAD 3, CLEAR 4 and RUN 5. For purposes of this description, the reference pulses 2 are considered to be present when the reference signal is at the low or zero level while the CLK, LOAD, CLEAR, RUN and output pulses are present when the signals are at the high value. It will be understood of course that the presence or absence of a high signal may or may not be construed to be the presence of a pulse depending upon the circuit conventional being used as well as the type of electronic logic whose use is desired. The occurrence of a reference pulse 2 will be operative to terminate or turn off the RUN pulse or signal 5. Termination of the reference pulse 2 will cause the next succeeding complete CLK or clock pulse 1 to be communicated to the LOAD output of the control 12 where it will be communicated to latch means 20. The second complete succeeding CLK or clock pulse 1 will be communicated as the CLEAR pulse 4 over the CLEAR output to binary counter 22. The initiation of the third succeeding CLK or clock pulse 1 will cause the RUN pulse or signal 5 to be initiated which is applied as one input to AND gate 24. As can be seen from FIG. 2, the clock signal pulse 1 need not be synchronized with respect to the reference signal pulses. The output pulses 6 are here illustrated as positive pulses and are not necessarily synchronized with the clock pulses since depending on the circuit logic of the implementation the leading edges of the output pulses 6 may be synchronized with respect to either the leading or trailing edge of the CLK or clock pulses 1 or may have a different or differing time relationship with respect to the CLK or clock pulses 1. There will, however, be a one-to-one relationship between each output pulse 6 and a CLK or clock pulse 1. Referring now to FIG. 1, the binary counter 22 is arranged to communicate with latch 20 which is arranged to communicate with the output signal generator 18 which generates the desired output signal on output lead 32. The binary counter 22 also communicates with an overflow detector 26 which is operative to indicate the occurrence of an input signal frequency which is lower than can be multiplied. Further description of this function is provided hereinbelow with respect to FIG. 3.

With reference now to FIGS. 1 and 2, the functional operation of FIG. 1 block diagram will be described. Clock oscillator generates a high frequency signal consisting of a large number of pulses here illustrated as a square wave signal having a frequency of, for example, 10 mHz. This signal is applied to the control 12 the clock signal dividing counter 16 and the output signal generator 18. Clock signal dividing counter 16 is operative to generate an output signal on output lead 28 every time the clock oscillator 14 generates a number of consecutive pulses which equals a number which has been preestablished for the clock signal dividing counter 16. In this instance, that number is set to equal the multiplicative factor which it is desired to be applied to the frequency of the reference pulse input signal. This produces, on output line 28, a signal which is occurring at the clock signal frequency divided by a number which corresponds to the multiplicative value or is numerically related thereto. The occurrence of a reference pulse on input lead 10 will cause the control device to terminate the RUN signal 5 which is also being applied to the AND gate 24. This will cause the output of the AND gate to remain at a nonsignal level without regard to the occurrence of an input signal pulse on input conductor 28. The application of the LOAD signal 3 to the latch 20 will be operative to set that latch to a number having a variable value determined by binary counter 22 and whose significance will be described hereinbelow. The application of the CLEAR signal 4 to binary counter 22 will be operative to set the output of the binary counter to zero preparatory to receiving pulse signals from AND gate 24 which pulses will be counted. Restoration of the RUN signal 5 to AND gate 24 will be operative to permit pulses which appear on conductor 28 to be communicated to the binary counter 22. These pulses will be counted by binary counter 22 and the count will continue registering each such pulse until the termination of the RUN signal 5 applied to AND gate 24 which will indicate the occurrence of the next succeeding reference pulse 2 on input conductor 10. Subsequent application of the LOAD signal 3 to the latch will cause the latch to register the number then appearing on the binary counter and to store that number for later reference. This number represents the period of time which has elapsed between the preceding two consecutive reference signal pulses. As indicated by the output conductor 30, this number when appropriately translated in terms of time will represent the period of the reference pulse signal. This number is applied to the output signal generator 18 which then operates to count the number of clock oscillator pulses applied to it and to generate an output signal on output conductor 32 every time the count of the clock signal pulses registered by it equals the number applied to it by latch 20. One example of output signal generator 18 would be a variable-modulo counter (VMC). A VMC may be described as a counter for generating an output pulse for every $N^{th}$ input pulse where N is variable and may be determined by an externally applied number signal. The output signal appearing on output conductor 32 therefore corresponds to the frequency of the clock signal divided by some variable number, $n$, with $n$ being equal to the frequency of the clock divided by the fixed multiplicative value (the output of the clock signal dividing counter 16) multiplied by the period of the input signal pulse frequency which number, $n$, is the number stored in the latch means 20.

Figure 3:
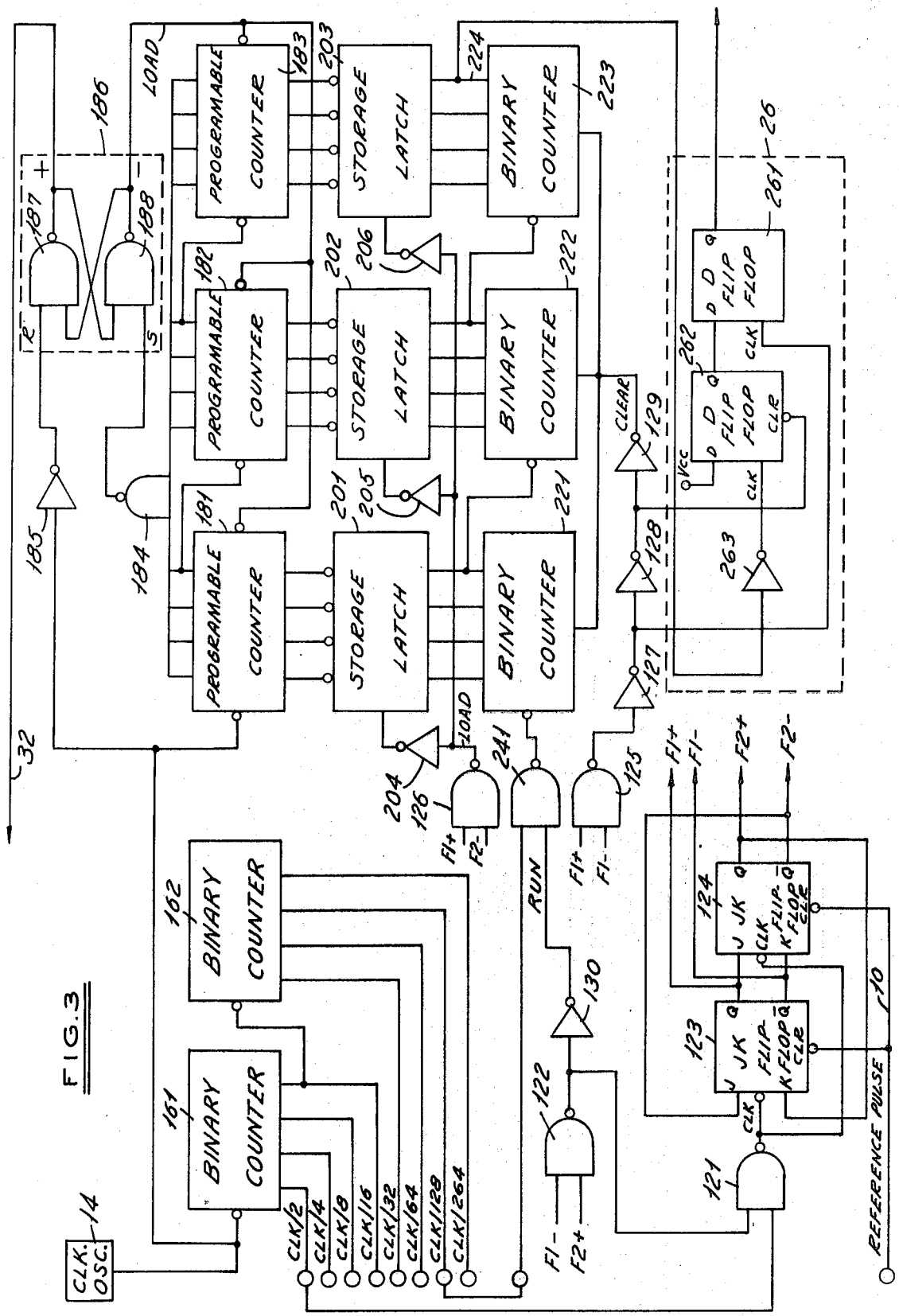
FIG. 3 illustrates a schematic diagram which corresponds to the block diagram of FIG. 1 but which replaces each of the blocks of the FIG. 1 diagram with the necessary integrated circuit components for performing the functions ascribed to each of the FIG. 1 blocks.

Referring now to FIG. 3, a schematic diagram for the circuit of FIG. 1 block diagram is illustrated. The circuit as illustrated is implemented in transistor transistor logic (TTL) utilizing NAND gates, signal inverters, and a plurality of commercially available integrated circuits. The block diagram of FIG. 1 could also be implemented in diode-transistor logic (DTL), metal-oxide-semiconductor (MOS) logic, complementary metal-oxide semiconductor (CMOS) logic, and emitter-coupled logic (ECL) depending on cost objectives and range of frequency operation. As the individual elements of the FIG. 3 diagram are readily available, they will merely be identified and their interrelationship will be described hereinbelow. In order to readily associate the FIG. 3 circuitry with the block diagram of FIG. 1, the various elements of the FIG. 3 circuitry are identified with three digit numbers the first two digits of which identify the FIG. 1 structure with which the FIG. 3 structure is associated with the third digit being used to differentiate between the various elements within any one component.

The clock oscillator 14 may be any one of the many available oscillators which generate a relative high frequency output signal. In the application of the present invention to a system having a maximum input frequency of about 400 Hz. and using a binary counter 22 having 12 bits of information, a clock oscillator 14 having a frequency of from about 5 mHz. to about 20 mHz. is satisfactory and a clock oscillator having a frequency of 10 mHz is optimum. Such a clock oscillator may be for example a Conner-Winfield L—14C adjusted or set for a 10 mHz. output signal. The clock signal dividing counter 16 is comprised of a pair of binary counters 161, 162 and may be for example Texas Instruments integrated circuits 7493. These integrated circuits are provided with a plurality of output connections arranged to represent the input signal divided by various powers of two from one through eight so that the multiplicative factor for the present invention may have a value of 2, 4, 16, 32, 64, 128 or 264. For purposes of illustration, a multiplicative value of 128 has been selected and is represented by the connection between the pin identified as CLK/128 and the NAND gate 241. The NAND gate 241 may be for example integrated circuit package 7400 available from Texas Instruments, Inc. Circuits representing the various components identified hereinbelow may be found in The Integrated Circuit Catalog for Design Engineers, First Edition by Texas Instruments, Incorporated wherein the 74 series of integrated circuit logic components are illustrated and described with equivalent circuit diagrams and additional functional and descriptive material. NAND gate logic has been selected for this representation because of its ready availability and low cost. In this embodiment, the 10 mHz. square wave signal from clock oscillator 14 is not applied directly to control 12 in order to provide clock signal pulses of sufficient time duration to assure adequate spacing and duration of the LOAD, CLEAR and RUN signal pulses. Since the binary counters 161, 162 of the clock signal dividing counter 16 have a plurality of output connections which are not in use, it is convenient to connect the pin identified as CLK/2 to the input NAND gate 121 of the control device 12. Control device 12 also includes NAND gate 122, a pair of flip-flops 123, 124, further NAND gates 125, 126 and signal inverters 127, 128 and 129. The flip-flops 123, 124 as illustrated herein are JK flip-flops readily available packaged in pairs from Texas Instruments, Inc. integrated circuit modules or packages 74107. The flip-flops are operative to produce complementary output signals which are identified as F1+, F1−, F2+, and F2−, with the various outputs and inputs being interconnected. Various combinations of these outputs are also applied to NAND gates 122, 125 and 126 to produce the desired LOAD, CLEAR and RUN output signals.

Binary counter 22 is illustrated as being comprised of three four bit binary counters identified as 221, 222 and 223. These binary counters are readily available from Texas Instruments, Inc. as integrated circuit packages 7493 and in this configuration are arranged to respond to the removal of input signal or the low-going edge of a signal to perform a count function and the application of positive signal on another lead to perform the CLEAR function. Binary counters 221, 222 and 223 are operative to generate a binary word comprised of a sequence, in this instance 12, of binary 1's and 0's representing the number of pulses applied by NAND gate 224 since the application of the preceding CLEAR signal. This binary word is applied as the input signal to storage latches 201, 202 and 203 which receive, store and nondestructively read out the binary word. The latches 201, 202 and 203 may be for example Texas Instruments, Inc. integrated circuit packages 7475. Each of these integrated circuit packages 7475 is available with eight outputs, pairs of which are complements. That is, one of the pair will be a 1 and the other of the pair will be a 0. In this application, and for reasons to be elaborated on hereinbelow, the complemented value of the input is connected to the output signal generator which is comprised of three programmable counters 181, 182 and 183. Output signal generator 18 is further comprised of NAND gate 184, inverter 185 and output flip-flop 186. The programable counters may be for example Texas Instruments, Inc. integrated circuit packages 74197 while flip-flop 186 may be an RS flip-flop. In the embodiment illustrated flip-flop 186 is comprised of a pair of NAND gates 187, 188 each having its output cross coupled to one of a pair of inputs to the other NAND gate. As illustrated, the R, or reset input is derived from inverter 185 and the S, or set input is derived from the NAND gate 184. The output of NAND gate 187, the NAND gate receiving the R input, is designated the + output while the output of NAND gate 188, the NAND gate receiving the S input, is designated the − output. As illustrated, the RS flip-flop 187 is an unclocked RS flip-flop which is set and reset by low going transitions of the inputs.

The programable counters 181, 182 and 183 are interconnected to receive the clock oscillator signal and to respond to the negative going transition of that signal. By receiving the complement of the number generated by binary counter 22, and responding to the clock oscillator signal 14, the programable counters 181, 182 and 183 may be made to count up from the complement of the binary counter 22 number until the output signal appearing on each of the 12 output leads is a binary 1. At this point in time, the clock oscillator signal will be low and the signal inverter 185 will be applying a relatively high signal to input terminal R of the RS flip-flop 187. The NAND gate 184, in the presence of any 0's on its inputs will generate a binary 1 output and the occurring of all 1's on its input leads will cause the binary 1 to switch to a binary 0 producing a low going output signal for receipt by the S input terminal of the RS flip flop. In this configuration, the receipt of a relatively high signal on input terminal R coupled with the transition of a high to a low signal on input terminal S will cause a positive or high going signal transition on the output terminal identified as + and a negative or low going signal transition appearing on the signal identified as − . A low going transition appearing at the − output terminal of the RS flip-flop 187 will operate to cause the programable counters 181, 182 and 183 to reset to the value of the input number which in this instance is the compliment of the count generated by the binary counter 22 during its last cycle of operation and presently stored in direct and complemented form in storage latches 201, 202 and 203. By resetting programable counters 181, 182 and 183, the input to NAND gate 184 will no longer be all binary 1's and the output therefore will go high. Once the signal applied to the S input terminal of the RS flip-flop is high, the next clock oscillator pulse, inverted by inverter 185, will cause the input appearing at the R terminal to go low and this low going transition at the R input will cause the + terminal output to go low and the − output terminal to go high terminating the provision of the output signal on conductor 32. Programable counters 181, 182 and 183, having been reset to the complement of the value of the previous count of the binary counter 22, will again count clock signal pulses up to the value of an all binary 1's output where the 1's detector NAND gate 184 will cause the S input to RS flip-flop 186 to experience a low going transition generating a second output pulse on output conductor 32. This operation will continue to cycle at the rate determined by the complement of the previous count of binary counter 22 until such time as the control device 12 receives the next succeeding reference pulse.

As illustrated herein, NAND gate 184 has a large number of inputs corresponding to the number of bits in the binary counters 221, 222, and 223, the storage latches 201, 202 and 203 and the programable counters 181, 182 and 183. Such a device is available as Texas Instruments, Inc. integrated circuit package 74S133.

Since the complemented value of the previous count of binary counter 22 is applied to the programable, or presettable, counters 181, 182, 183 and the direct, or uncomplemented, value is also present, this value can be extracted from storage latches 201, 202, 203 to directly yield a binary number which, if divided by the CLK frequency and multiplied by the desired multiple, will express, in seconds, the time interval between the two preceding reference pulses.

The application of the next succeeding reference pulse, applied, as illustrated, on conductor 10 to the clear terminals of the JK flip-flops 123, 124 will cause the Q+ outputs of each to be low and the Q− outputs of each to be high. This corresponds to the generation of a positive signal on outputs F1− and F2− while outputs F1+ and F2+ have no signal. At this point in time, the LOAD signal is low, the CLEAR signal is low, and the RUN signal is low. The output status of the JK flip-flops will remain the same until termination of the reference pulse and the application of a pulse to the terminals of the JK flip-flops identified as clock. As is known, JK flip-flops have an output determined by the status of the J and K inputs at the time of application of a clock signal. The application of a clock signal will therefore cause the JK flip-flop 123 to change state and JK flip-flop 124 to remain as set causing the output signals to be present on leads F1+ and F2− which corresponds to a pair of binary 1's applied to the inputs of NAND gate 126 which constitutes the LOAD signal. This signal is applied to storage latches 201, 202 and 203 through drivers 204, 205 and 206 to cause them to receive and store the binary word which constitutes the then existing output of binary counter 221, 222 and 223. NAND gate 121 is receiving a relative high signal from NAND gate 122 so that the next following CLK/2 pulse will be applied to the JK flip-flops 123, and 124 and will cause JK flip-flop 124 to change state while JK flip-flop 123 remains the same. This corresponds to the output signals appearing on leads F1+ and F2+ so that NAND gate 125 produces a relatively low output signal. This low is inverted by inverter 127 to a high which is applied to the clock input of a D flip-flop 261 in overflow detector 26. This relatively high input is also inverted to a relatively low input by inverter 128 for application to the clear terminal of D flip-flop 262 of the overflow detector 260. This relatively low signal is again inverted by inverter 129 to provide a relatively high signal for application to the binary counters 121, 122 and 123 to clear these devices so that their binary word output signal is comprised of all binary 0's. The change of state of the output leads of JK flip-flop 124 putting the high signal on output lead F2+ results in the inputs to NAND gate 126 being of opposite character so that the output signal from that device becomes a binary 0 and the storage latches 201, 202 and 203 will not respond to the output of binary counter 221, 222 and 223. The next succeeding CLK/2 pulse will be applied to the JK flip-flops 123, 124 and will cause the JK flip-flop 123 to change state since the K input is high and the J input is low while the flip-flop 124 remains as before. This will result in the output signal appearing on leads F1− and F2+ which corresponds to the necessary input value for NAND gate 122. This causes the output of NAND gate 122 to switch from a relatively high signal to a relatively low signal which is inverted to a relatively high signal by inverter 130 to provide the RUN signal for NAND gate 241. The appearance of a low signal at the output of NAND gate 122 is operative to disable NAND gate 121 to prevent the passage of further CLK/2 pulses to the clock inputs of the JK flip-flops 123 and 124 terminating the operation of the control device.

Overflow detector 26 is comprised of a pair of D flip-flops 261, 162 such as, for example, Texas Instruments, Inc. integrated circuit package 7474 (having a pair of D flip-flops). Flip-flop 261 is arranged to generate a high going transition signal in the presence of a count in binary counter 22 which exceeds the capacity of binary counter 22. Overflow has occurred when the most significant bit of binary counter 22 returns to a binary 0 after having been a binary 1 in the absence of a CLEAR signal being applied to binary counter 22. Flip-flop 262 has its D input connected to a source of a binary 1, identified as Vcc. The clock input is connected to the output of inverter 263 which inverts the binary value appearing on the most significant output lead 224 of binary counter 22. Thus, the clock input of flip-flop 262 will receive a high going transition or signal for each low going transition of binary counter output lead 224. In the absence of a CLEAR signal being applied to flip-flop 262, such a transition will cause a positive signal to appear on the Q output of flip-flop 262 and on the D input of flip-flop 261. The next CLEAR signal will cause the output of inverter 127 to have a high going transition prior to the output of inverter 128 having a low going transition and this high going transition will be applied as a clock pulse to flip-flop 261 generating the overflow indicative output signal. A small fraction of a second later, as determined by the switching time of inverter 128, a low going transition will be received as a high going transition at the clear input (shown as an inverting input) to set the Q output of flip-flop 262 low. Flip-flop 261 will remain as before. A small fraction of a second later, as determined by the switching time of inverter 129, the CLEAR signal will be applied to binary counter 22. If overflow has not occurred, this sequence of inverter stage will operate to set the Q output of flip-flop 262 low prior to the switching of the most significant bit 224 low so overflow will not be signalled. However, once overflow has occurred, the overflow signal will remain until such a time as the output of inverter 127 experiences a positive going transition while the Q output of flip-flop 262 is low.

Considered algebraically, an input signal having a frequency, $Fi$ is to be multiplied by a number of $M$. to produce an output signal having a frequency $fo$ such that $$M \cdot fi = fo \qquad 1.$$

to accomplish this multiplication, a clock signal having a very high frequency $Fc$ with repsect to the maximum value of $fo$ is divided by a number $n$ such that $$fo = Fc/n \qquad 2.$$

From equations 1 and 2, we obtain $$M \cdot Fi = Fc/n \qquad 3.$$

or $$n = Fc/M \cdot fi \qquad 4.$$

We also know that the period of a signal, $t$, is the reciprocal of the frequency of the signal such that $$ti = 1/fi \qquad 5.$$

We can therefore substitute equation 5 into equation 4 to obtain $$n = Fc \cdot ti/M \qquad 6.$$

Equation 6 tells us that if the clock signal frequency is divided by the desired multiplicative value for a period of time equal to the period of the input signal, the desired number $n$ is generated which may then be used to directly divide the clock signal frequency to produce an output signal whose frequency has the desired multiplicative relationship with respect to the input signal frequency. Furthermore, by recalculating the number $n$ every occurrence of the input signal pulse, the output signal frequency is able to respond very rapidly to changes in the input signal frequency.

We claim:

1. A circuit for generating a selected number of output pulses in response to a received input signal pulse, wherein the frequency of the input signal may vary, comprising in combination:

means for receiving the input signal pulses;

clock means for generating a clock signal having a frequency greatly in excess of the input signal;

first divider means for generating a first signal having a pulse frequency equal to the clock signal frequency divided by a first integer;

first counter means responsive to the received input signal operative to receive and count the number of first signal pulses occurring between two input signal pulses to generate a second integer signal;

second divider means responsive to said first counter means and to said clock means for generating an output signal having a pulse frequency equal to the clock signal frequency divided by the second integer.

2. The circuit of claim 1 wherein the value of the first integer is equal to the value of the selected number.

3. The circuit of claim 1 wherein said first divider means comprise:

second counter means receiving the clock signal and operative to repeatably count the number of clock signal pulses received up to the value of the first integer and further operative to generate an output signal pulse every time the count reaches the value of the first integar.

4. The circuit of claim 1 wherein said second divider means comprise:

means responsive to the first counter means for receiving and storing a signal representative of the second integer; and third counter means responsive to the receiving and storing means and receiving the clock signal operative to repeatably count the number of clock signal pulses received to the value of the second integer and further operative to generate an output signal pulse every time the count reaches the value of the second integer.

5. The circuit of claim 1 including further control means responsive to each input signal pulse to terminate the count of said first counter means to thereby determine the value of the second integer; and storage means responsive to the control means for storing the second integer value.

6. The circuit of claim 5 wherein said first divider means comprise:

second counter means receiving the clock signal and operative to repeatably count the number of clock signal pulses received up to the value of the first integer and further operative to generate an output signal pulse every time the count reaches the value of the first integer.

7. The circuit of claim 6 wherein said second divider means comprise:

means responsive to the first counter means for receiving and storing a signal representative of the second integer; and third counter means responsive to the receiving and storing means and receiving the clock signal operative to repeatably count the number of clock signal pulses received to the value of the second integer and further operative to generate an output signal pulse every time the count reaches the value of the second integer.

8. A method for converting a variable frequency input signal at a relatively low frequency to an output signal at a relatively high frequency which is a selected multiple of the input signal frequency comprising:

receiving the input signal;

generating a clock signal having a frequency which is high compared to the maximum desired output signal frequency;

dividing the clock signal by a value which corresponds to the selected multiple to produce a signal having a frequency which corresponds to the clock signal frequency divided by the selected multiple;

counting the number of pulses in the divided clock signal which occur between two input signal pulses to generate a number signal; and dividing the clock signal by the number represented by the number signal to produce the output signal.

9. The method of claim 8 wherein the step of dividing the clock signal by a value which corresponds to the selected multiple comprises:

counting each clock signal pulse; and generating an output signal pulse each time the count reaches the value which corresponds to the selected multiple.

10. The method of claim 8 wherein the step of dividing the clock signal by the number represented by the number signal comprises the steps of:

storing the number represented by the number signal; and dividing the clock signal by the generated number for a period of time following the second of the two input signal pulses until a third input signal occurs, the third input signal having the same relationship to the second input signal as the second input signal has to the first input signal.

11. The method of claim 8 wherein the step of dividing the clock signal by the number represented by the number signal comprises the steps of:

storing the number represented by the number signal;

nondestructively reading the stored number to establish a count value;

counting clock signal pulses until the count equals the count value;

generating an output signal when the count equals the count value; and repeating the last named reading count and generating steps.

12. The method of claim 11 wherein the step of storing the number include the step of storing the binary complement of the number.

13. The method of claim 12 wherein the steps of reading the stored number and counting the clock signal pulses comprise the steps of:

nondestructively reading the binary complement of the stored number to set an initial count value;

adding the pulses of the clock signal to the initial value to increase the initial value; and detecting the attainment of a predetermined maximum count value.

14. In a circuit for receiving a variable frequency input signal and generating an output signal having a frequency which is a fixed high multiple of the input signal frequency, the improvement comprising:

variable-modulo counter means operative to receive a high frequency clock signal and a number signal and responsive thereto to generate an output signal at a frequency equal to the clock signal frequency divided by the received number;

counter means for counting the number of pulses of a predetermined frequency pulse signal which occur between two input signal pulses; and storage means for storing a number representative of the count and for communicating this number to the variable-modulo counter means.

15. The circuit of claim 14 wherein the counter means comprise a binary counter and the storage means comprise means for storing the binary representation of the number counted and for storing the binary complement of the number counted.

16. The circuit of claim 15 wherein the variable modulo counter means comprise a binary up-counter and the number generator means are operative to establish an initial count value, said initial count value being the binary complement of the number counted by the counter means.

17. The circuit of claim 16 including further signal generator means responsive to the binary upcounter operative to generate the output signal;

said signal generator means including a binary 1's detector means responsive to the variable-modulo counter means operative to detect a maximum count condition of said variable-modulo counter means.

18. The circuit as claimed in claim 14 wherein said signal generator means further include means responsive to the binary 1's detector to generate an output signal on the occurrence of a signal indicative of a maximum count and thereafter operative to generate a signal for reestablishing the initial count value.

19. The circuit as claimed in claim 17 wherein said signal generator means comprise bistable gating means responsive to the clock signal and to the binary 1's detector operative to generate a high going output signal in response to the binary 1's detector detecting a condition of a maximum number count by the binary up-counter and also operative to generate a signal for reducing the count value to equal the initial count value whereby the output signal will be terminated to produce an output signal pulse.

20. A method for generating a selected number of pulse signals in response to a pulse of an input signal having a variable pulse frequency, the output signal frequency being variable in response to variations in the input signal frequency, comprising the steps of:

generating a clock signal having a frequency which is high with respect to the maximum desired output signal frequency;

dividing the clock signal by a fixed divisor number to produce a lower frequency signal;

counting the number of pulses of said lower frequency signal occurring between two input signal pulses;

storing the count number; and, subsequent to the occurrence of the second of the two input signal pulses, dividing the clock signal by a variable number which is a function of the stored number and of the fixed divisor number to generate the output signal.

* * * * *